3,313,792
PROCESS FOR POLYMERIZING CONJUGATED DI-
ENES WITH A CATALYST COMPRISING AN
ALUMINUM HALIDE, A SALT OF COBALT OR
NICKEL, AND A COMPOUND OF THE FORMU-
LA $SiH_xY_{(4-x)}$
Edward W. Duck, Hythe, England, and Jacques A. Water-
man, Amsterdam, Netherlands, assignors to Shell Oil
Company, New York, N.Y., a corporation of Delaware
No Drawing. Filed Feb. 25, 1963, Ser. No. 260,855
Claims priority, application Netherlands, Mar. 16, 1962,
276,019
7 Claims. (Cl. 260—94.3)

The invention relates to a process for the polymerization of conjugated dienes to products in which the cis-1,4 configuration predominates, in the presence of new catalyst systems. The invention also relates to the preparation of these catalyst systems. The term "polymerization" is also meant to include copolymerization of different conjugated dienes with each other.

A recently developed process for the polymerization of conjugated dienes with the aid of catalyst systems requires the combination of one or more cobalt and/or nickel compounds with one or more aluminum halides, characterized in that into these systems are also incorporated one or more tin compounds which contain one or more groups of the type

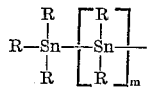

in which at least one of the letters R stands for an alkyl or aryl group, while the other letters R represent identical or different units of which each one individually may be either in alkyl, aryl, alkoxy or aryloxy group or a halogen or hydrogen atom, in which $m$ is a whole number.

A related process for the polymerization of conjugated dienes requires catalyst systems obtained by the combination of one or more cobalt and/or nickel compounds with one or more aluminum halides, but which systems are characterized in that into them there are incorporated one or more tin compounds of the general formula $$SnH_xR_{(4-x)}$$

in which R stands for a hydrocarbon radical and $x$ is greater than zero and smaller than 4.

These processes give rise to very fast polymerization rates very high cis contents in the products.

It has now been found that alternatively very high cis contents can be attained by the agency of catalyst systems in the preparation of which use is again made of a cobalt or nickel compound and an aluminum halide, but comprising as a third constituent certain organic silicon compounds, in particular silicon compounds containing one or more silicon atoms and one or more silicon-bound hydrogen atoms as well as one or more silicon-bound hydrocarbon radicals. In general, the polymerization rates in the latter process do not reach such extermely high values as in the two former processes, so that control is facilitated and gelation avoided more easily.

The invention can be defined as relating to a process for the polymerization of conjugated dienes by means of catalyst systems obtained by combination of one or more cobalt and/or nickel compounds with one or more aluminum halides, characterized in that into these systems are also incorporated one or more organic silicon compounds of the general formula $$SiH_xY_{(4-x)}$$

in which $x=1$, 2, or 3 and Y represents a hydrocarbon radical or a group—$SiR_zH_{(3-z)}$, in which group R stands for a hydrocarbon radical and $z=0$, 1, 2, or 3. If the number of Y-groups is greater than 1, these groups may be equal or different among themeselves.

Suitable hydrocarbon radicals, which may also be equal or different among themselves, are, for instance, branched or non-branched alkyl groups and/or cycloalkyl and/or aryl groups, which may have been substituted by alkyl groups, if desired. Alternatively, carbon atoms from two or more different hydrocarbon radicals may have been linked into ring structures, in which silcon atoms can also occur as ring atoms.

Of the organic silcon compounds to be used according to the invention those compounds are in particular preferred which contain only one or two silicon atoms and in which the hydrocarbon radicals are alkyl or aryl groups having not more than eight carbon atoms, while the number of H-atoms per silicon atom is two at most, for instance, silicon trimethyl hydride, silcon triethyl hydride, silicon diethyl dihydride, silicon tributyl hydride, silicon diphenyl dihydride, pentaethyl disilane, 1,1-dimethyl disilane.

The use of organic silicon compounds which do not contain silicon-bound hydrogen atoms, such as, for instance, $Si(C_2H_5)_4$, $Si_2(C_2H_5)_6$ and $Si_2Cl_6$ instead of the silicon compounds according to the invention, gives no polymerization at all. In this respect, the silicon compounds which contain exclusively hydrocarbon radicals evidently differ in behaviour from the corresponding tin compounds.

The preferred aluminum halide is aluminum chloride, the second in order of preference being aluminum bromide.

Of the cobalt and/or nickel compounds those are preferred which are soluble in the reaction mixture, hence in hydrocarbons, and, if desired, also in the diluent which may be used in the polymerization. Examples are the cobalt and/or nickel salts of organic acids preferably having 8–24 carbon atoms such as naphthenic acids and saturated and unsaturated, branched and unbranched aliphatic carboxylic acids, e.g., fatty acids. They may also be complexes of cobalt and/or nickel halides with amines, for instance, pyridine, or with alcohols and ketones, or again with aluminum chloride and/or alkyl-aluminum compounds for instance, monoalkylaluminum dihalides. The complexes of cobalt and/or nickel halides with aluminum compounds are preferably prepared beforehand by mixing of the components in the presence of hydrocarbons, for instance, benzene or isooctane. After the components have reacted together for some time (for instance, for some hours, with heating, if desired, for instance up to the boiling point of the hydrocarbon at atmospheric pressure), the resultant solution of the complex is separated from any remaining solid constituents by filtration or similar means. As a rule it is only then that the solution is diluted to the concentration to be used in the polymerization.

Alternatively, however, in the process according to the present invention one may also use cobalt and/or nickel compounds that are not or hardly soluble in the diluent employed in the polymerization, for instance, cobalt and/or nickel halides.

The catalyst is prepared by mixing of the catalyst-forming components. As a rule, this mixing takes place in the presence of a diluent, for instance, a hydrocarbon. If desired, the monomer to be polymerized may also be present during the mixing, possibly under conditions favoring the polymerization.

The catalyst components may be either included in the mixing process together or added in any order. If desired, there may be a considerable time interval between the times of admitting the various components to the mixing process.

In certain cases, an appreciable time of reaction between the components, or between some components, before contact between the catalyst components and the monomer, at any rate before the beginning of the polymerization, may enhance the activity of the catalyst and also have some influence on the nature of the polymers to be prepared with the catalyst. These results depend at the same time on the temperature at which the catalyst is prepared. As a rule this temperature lies between 0 and 150° C.

A very convenient method of catalyst preparation according to the invention consists in first mixing an aluminum halide with a silicon compound (as described in the definition of the invention), preferably at temperatures between 20 and 100° C. and in the absence of diluent, and later introducing into the mixture a cobalt and/or nickel compound together with a diluent. More active catalysts and higher cis-1,4 contents in the polymer are obtained in this manner than when a different order is followed in compounding the catalyst. In this case, it is recommended to bring the system, in which the aluminum halide and the silicon compound have been allowed to react together, into contact with the monomer to be polymerized, thereby creating conditions suitable for the polymerization, or at any rate conditions at which polymerization is possible, and only then to add the cobalt and/or nickel compound. In this manner, a very active catalyst system is formed in only a few minutes.

Another very useful procedure is that in which initially a cobalt and/or nickel compound is mixed with an aluminum halide and the silicon compound is added later.

In certain cases it may be desirable to impose a limit on the progress of the mutual action of the catalyst components. To this end, one may store the mixture of the silicon and the aluminum compounds before use at a low temperature, for instance between −20 and +20° C. Such a case may present itself when portions of the same mixture of catalyst components are used in the polymerizations carried out at different times and when a good reproducibility of results is required.

The ratios of the amounts of catalyst components can vary within wide limits. The atomic ratio of the sum of aluminum and silicon to cobalt and/or nickel as a rule between 10:1 and 100,000:1, preferably 15:1 to 1000:1. The atomic ratio of aluminum to silicon lies as a rule between 0.01 and 100, preferably between 0.1 and 10.

Even in very low concentrations the cobalt and/or nickel compounds which are soluble in hydrocarbons have a striking effect as components of the catalyst systems according to the present invention. Preferably, these concentrations are even lower than corresponds with 0.5 milliatom cobalt and/or nickel per litre of diluent, for instance, 0.01–0.03 milliatom/litre. It stands to reason that these low concentrations are attractive because of reduced consumption of chemicals. In addition, the concentrations of cobalt or nickel in the ultimate products are so low that removal is in general unnecessary, so that a cumbrous operation is eliminated.

When butadiene is treated by the process according to the invention, there is practically only 1,4-polymerization and hardly any 1,2-polymerization. The product shows almost wholly the configuration cis-1,4. When isoprene is the starting material for this process, the 1,4-polymerization also predominates, but in this case there may be a fair degree of 3,4-polymerization as well. Other conjugated dienes which may be polymerized with the catalysts of this invention include 2,3-dimethyl butadiene-1,3 and piperylene.

If the catalyst-forming components are mixed in presence of a liquid organic diluent, it is recommended to choose the same medium as is used in the polymerization.

The medium in which the catalyst can be prepared—if so desired—by mixing the components together, and the medium in which the polymerization is subsequently carried out, are preferably composed substantially of saturated aliphatic, cycloaliphatic and/or aromatic hydrocarbons, such as hexane, isooctane (2,2,4-trimethylpentane) cyclohexane, benzene, toluene and/or the xylenes. The nature of the medium may also have a marked influence on the polymerization, notably on the rate of it. Butadiene polymerizes much faster with the specified catalyst systems in an aromatic medium than in an aliphatic medium, whereas for isoprene the reverse is true. The medium sometimes has some influence also on the nature of the products.

Suitable temperatures for the polymerization are those between −20° C. and 150° C., in particular those between 0 and 70° C. Higher and lower temperatures are not precluded however.

Suitable pressures are those between 1 and 5 atm. abs., if gaseous dienes are polymerized. Under special conditions, however, it is possible to use higher or lower pressures.

From the preceding it is clear that the process according to the invention presents many possibilities of control. Variable conditions are: the choice of the various components of the catalyst system, the concentrations of these components, the ratios of these concentrations, the choice of the medium and possibly the ratio of aliphatic to aromatic hydrocarbons in it, the ageing of the catalyst, i.e., the time during which the catalyst components react together before the polymerization, the temperature at which this action or ageing takes place, and finally the temperature and pressure during the polymerization. This process is therefore readily adaptable, even if high and varied requirements are imposed on the nature of the product and the rate of polymerization. A point of great interest is that the average molecular weight of the polymer can be satisfactorily adjusted at will, without any hydrogen being applied during the polymerization.

Both the preparation of the catalyst and the polymerization of the conjugated dienes, according to the invention, can be performed batchwise or continuously, the latter—if desired—in homogeneous reaction mixtures of constant composition.

EXAMPLE I

Comparative experiments were done in reactors from which the air had been swept by dry oxygen-free nitrogen. Catalyst components as specified in the table below were introduced into these reactors. When $AlCl_3$ was employed together with a silicon compound, these two components were previously mixed without diluent, in the manner indicated more fully in the table. The cobalt compound was invariably admixed last. It was previously dissolved in benzene at room temperature. Instantly after addition of this solution the reactors were placed in a cooling bath and butadiene was passed through. In the experiments conducted according to the invention, the polymerization started virtually at the same moment.

The mixtures were invariably kept saturated with butadiene or nearly so, until the end of the experiment. Finally, the polymer formed was precipitated by addition of isopropanol, filtered, washed with fresh isopropanol, and dried in vacuo at 60° C.

In the table a survey is given of the varied conditions and the results. The experiments performed according to the invention (1–3) gave very favorable results, quite unlike those obtained in comparative experiments made in the absence of silicon compounds or with other silicon compounds (4–7).

For comparison, the table includes two experiments (8 and 9) relating to the use of distannanes as catalyst-forming components as well as two experiments (10 and 11) relating to the use of tin hydrocarbyl hydrides as catalyst-forming components.

and a silicon compound having the general configuration $$SiH_xY_{(4-x)}$$

wherein $x$ is an integer between 1 and 3, and Y is a radical selected from the group consisting of hydrocarbyl radicals and radicals having the configuration $$SiR_zH_{(3-z)}$$

TABLE I

| Experiment No. | Si or Sn Compound | | AlCl₃, mmole/litre | Cobalt Compound, milliatoms Co per litre | | Benzene, ml. | Polymerization Conditions | | Rate of Polymer Formation, g./l.h. | Polymer Structure | | | Conditions of Mixing AlCl₃ with Si or Sn Compound |
|---|---|---|---|---|---|---|---|---|---|---|---|---|---|
| | Formula | Concentration, mmole/litre | | Naphthenate | Octoate | | Time min. | Bath Temp., °C. | | Cis, Percent | Trans, Percent | 1, 2, Percent | |
| 1 | Si(CH₃)₃H | 255 | 23 | 4.0 | | 32.8 | 60 | 25 | 76 | 93 | 4 | 3 | 5 min (steam bath). |
| 2 | Si(C₂H₅)₃H | 74 | 30.6 | | 2.0 | 100 | 13 | 25 | 134 | 95.5 | 2.4 | 2.1 | 30 min. (60° C.). |
| 3 | Si₂(C₂H₅)₅H | 75 | 30 | | 2.0 | 100 | 15 | 25 | 90 | 95.3 | 2.2 | 2.1 | 30 min. (60° C.). |
| 4 | | | 16.5 | 2.0 | | 45.5 | 12 | 0 | 0 | | | | |
| 5 | Si(C₂H₅)₄ | 25 | 36 | 2.0 | | 35 | 60 | 25 | 0 | | | | 5 min. (steam bath). |
| 6 | Si₂(C₂H₅)₆ | 22 | 37.6 | 2.0 | | 40 | 60 | 25 | 0 | | | | Do. |
| 7 | Si₂Cl₆ | 91 | 35 | 4.0 | | 32.2 | 30 | 25 | 0 | | | | Do. |
| 8 | Sn₂(C₂H₅)₆ | 109 | 16.5 | 2.3 | | 50 | 10 | 25 | 216 | 90 | 2 | 8 | 4 min. (steam bath). |
| 9 | Sn₂(C₂H₅)₆ | 36.4 | 22.6 | 2.0 | | 50 | 4 | 25 | ¹ 1,368 | 95 | 2 | 3 | Do. |
| 10 | Sn(C₂H₅)₃H | 74 | 30.6 | | 2.0 | 48.9 | 4 | 25 | ¹ 953 | 94 | 4 | 2 | 6 min. (25° C.). |
| 11 | Sn(C₂H₅)₃H | 50 | 10.4 | | 0.8 | 71.6 | 30 | 25 | 42 | 93 | 4 | 3 | 6 min. (25° C.). |

¹ During the working-up of the polymer gelation took place.

We claim as our invention:

1. The reaction product of an aluminum halide of a halogen having an atomic number of between 17 and 35, a hydrocarbon-soluble salt of a carboxylic acid having 8–24 carbon atoms per molecule and of a metal having an atomic number of 27–28 and a silicon compound having the general configuration $$SiH_xY_{(4-x)}$$

wherein $x$ is an integer between 1 and 3, and Y is a radical selected from the group consisting of hydrocarbyl radicals and radicals having the configuration $$SiR_zH_{(3-z)}$$

wherein R is a hydrocarbyl radical and $z$ is an integer between 0 and 3.

2. The reaction product of
  (a) aluminum chloride,
  (b) a hydrocarbon-soluble cobalt salt of a carboxylic acid having 8–24 carbon atoms per molecule;
  (c) and a silicon hydrocarbyl hydride.

3. The reaction product of
  (a) aluminum chloride,
  (b) a hydrocarbon-soluble cobalt salt of an aliphatic carboxylic acid having 8–24 carbon atoms per molecule;
  (c) and a silicon alkyl hydride having 1–2 hydrogen atoms directly attached to the silicon radical wherein the atomic ratio of the sum of aluminum and silicon to cobalt is between about 10:1 and 100,000:1, and the atomic ratio of aluminum to silicon is between 0.01 and 100.

4. A process comprising polymerizing a conjugated diene at a temperature between about −20° C. and 150° C. in the presence of a catalyst comprising the reaction product of an aluminum halide of a halogen having an atomic number between 17 and 35, a hydrocarbon-soluble salt of a carboxylic acid having 8–24 carbon atoms per molecule and a metal having an atomic number of 27–28, and a silicon compound having the general configuration $$SiH_xY_{(4-x)}$$

wherein $x$ is an integer between 1 and 3, and Y is a radical selected from the group consisting of hydrocarbyl radicals and radicals having the configuration $$SiR_zH_{(3-z)}$$

wherein R is a hydrocarbon radical and $z$ is an integer of between 0 and 3.

5. A process comprising polymerizing butadiene in an inert hydrocarbon diluent at a temperature between 0 and 70° C. in the presence of a catalyst comprising the reaction product of
  (a) aluminum chloride,
  (b) a hydrocarbon-soluble cobalt salt of an aliphatic carboxylic acid having 8–24 carbon atoms per molecule;
  (c) and a silicon alkyl hydride having 1–2 hydrogen atoms directly attached to the silicon radical, wherein the atomic ratio of the sum of aluminum and silicon to cobalt is between about 10:1 and 100,000:1, and the atomic ratio of aluminum to silicon is between 0.01 and 100.

6. A process according to claim 4 wherein the diene is butadiene.

7. A process according to claim 4 wherein the diene is isoprene.

References Cited by the Examiner

UNITED STATES PATENTS 3,066,128  11/1962  Youngman _____ 260—94.3
3,247,175   4/1966  Van Volkenburgh et al.
                                        260—94.3

FOREIGN PATENTS 617,798  9/1962  Belgium.
785,314  10/1957  Great Britain.
889,829  2/1962  Great Britain.

OTHER REFERENCES

Derwent Belgian Patents Report, vol. 94A, 1: Plastics, Metal Finishing, p. 4. Belgian Patent No. 617,798, O.P.I., Sept. 17, 1962, Wacker-Chemie, G.m.b.H. Scientific Library Call No. FOR.–Pat.–JRI.

JOSEPH L. SCHOFER, *Primary Examiner.*

H. I. CANTOR, *Assistant Examiner.*